United States Patent [19]

Patzelt

[11] Patent Number: 4,814,092

[45] Date of Patent: Mar. 21, 1989

[54] CENTRIFUGE PROCESSING OF SPENT EMULSION FROM PAINT SPRAY BOOTHS

[75] Inventor: Robert R. Patzelt, Wheaton, Ill.

[73] Assignee: Nalco Chemical Company, Naperville, Ill.

[21] Appl. No.: 252,311

[22] Filed: Oct. 3, 1988

[51] Int. Cl.[4] .......... B01D 17/038

[52] U.S. Cl. .......... 210/708; 210/724; 210/781; 210/803; 210/804; 210/805; 210/806

[58] Field of Search .......... 210/708, 724, 725, 665–667, 210/749, 781, 800, 803, 804, 805, 806; 55/19, 84–89

[56] References Cited

U.S. PATENT DOCUMENTS 4,067,806 1/1978 Mauceri .......... 55/89

*Primary Examiner*—Frank Sever

*Attorney, Agent, or Firm*—John G. Premo; Donald G. Epple; Anthony L. Cupoli

[57] ABSTRACT

In a process for removal of detackified oversprayed paint particles from paint spray booths of the type comprising a chamber, means for passing a wash stream capturing oversprayed paint particles across a liquid curtain and down through said chamber, a sump located at the bottom of said chamber and containing a circulating oil-in-water emulsion receiving said oversprayed paint particles from said wash stream, said oil-in-water emulsion comprised of:

(a) 1–50 weight percent of an organic liquid having a boiling point of at least 150° C., (b) 0.1–30 weight percent, based on the organic liquid, of an oil-in-water emulsifier, (c) the balance, water, and said emulsion having a pH ranging between about 7.5–12.0, and wherein the emulsion is circulated through the paint spray booth until the oil-in-water emulsion collects, detackifies, and suspends at least 5 parts by weight of said oversprayed paint solids for every 100 parts by weight of said organic liquid, thereby forming spent emulsion, the improvement comprising:

(a) removing the spent emulsion, or a portion thereof, from the paint spray booth;

(b) adjusting the pH of the spent emulsion to below about 6.5, thereby breaking the spent emulsion into a first aqueous phase, an oil phase, and a paint sludge phase;

(c) allowing phase separation for sufficient time to isolate and remove at least a portion of the first aqueous phase from the oil phase and the paint sludge phase, thereby forming a low water spent emulsion, then (d) feeding the low water spent emulsion into a three-phase centrifugal separator operating so that said low water spent emulsion is treated at a machine gravity force ranging between about 10–5000 G's, and (e) separating from said centrifugal separator an oil phase, a second water phase, and a concentrated paint solids phase containing from about
10–25 weight percent oil,
10–20 weight percent water, and about
60–75 weight percent paint solids.

8 Claims, No Drawings

CENTRIFUGE PROCESSING OF SPENT EMULSION FROM PAINT SPRAY BOOTHS

The operation of a paint spray booth using an oil-in-water emulsion and/or hydrotropic solution which permit the collection of hydrocarbon emissions from paint solvents and also permit detackification of various kinds of paints as well as collections of these detackified solids is a recent development. These developments are set forth in U.S. Pats., No. 4,396,405, Lindenberger, et al; U.S. Pat. No. 4,563,199, Lindenberger, et al; U.S. Pat. No. 4,378,235, Cosper, et al; U.S. Pat. No. 4,750,919, Patzelt, et al; U.S. Pat. No. 4,444,573, Cosper, et al; U.S. Pat. No. 4,523,932, Cosper, et al; and U.S. Pat. No. 4,554,026, Cosper, et al; all of these references incorporated herein by reference.

In these teachings the oil-in-water emulsion is taught as a replacement for a normally operating water curtain in a paint spray booth and also is taught as being useful to detackify some paints such as low solids enamels, various lacquers, water based base coats, and clear coats which are used over the base coat to achieve gloss, and the like. The piece, or "job" to the operator, being sprayed is rotated or drawn into the booth and the spray gun nozzle aims a fine spray of the paint being used at the piece which is coated by the paint, and then moved into a drying process and finally to collection, inspection and shipping for eventual use. The paint which does not fall upon the piece being coated is immediately contacted with the liquid film going through the paint spray booth and when this liquid film is the oil-in-water emulsion found to be useful in the above references, each and all of the following events can occur:

(a) The hydrocarbon vapors are collected within the circulating oil-in-water emulsion and can be removed from the oil-in-water emulsion either before or after the emulsion is broken into its separate phases.

(b) The paint overspray contacts the oil-in-water film circulating through the paint spray booth, is detackified, and the paint solids are dispersed within the emulsion, primarily within the oil phase of the emulsion. However, some detackified paint solid can be dispersed within the aqueous phase as well.

(c) The detackified solids are recirculated within the oil-in-water emulsion until that time where the oil-in-water emulsion is separated from the paint spray booth system and the system accompanying sumps which collect and serve as a source of this emulsion for the paint spray booth system. The spent emulsion containing at least 5 weight percent paint solids, based on the oil phase in the emulsion, is then treated with acid, so as to adjust its pH below about 6.5, preferably to a pH of about 3, and the separate phases of the emulsion are then permitted to separate. These phases normally comprise an aqueous phase and an oil phase, and when the oil-in-water emulsion is permitted to circulate to the point where a certain amount of paint solids are collected, as taught in U.S. Pat. No. 4,750,919, Patzelt, et al, incorporated above by reference, the oil phase can also contain a paint sludge phase which is then treated for removal.

In the Patzelt teachings of U.S. Pat. No. 4,750,919, the paint spray booths are operated continuously until at least 5 parts by weight of the oversprayed paint solids are received by the circulating emulsion for every 100 parts by weight of the organic liquid contained in the emulsion. Patzelt teaches that in his preferred embodiment, the oil-in-water emulsion is circulated with contact of the oversprayed paint solid until at least 10 parts by weight of the oversprayed paint solids per 100 parts by weight of the organic liquid contained in the circulating emulsion are received into the circulating emulsion.

The method of Patzelt also permits the detackification and dispersal of these oversprayed paint solids into the emulsion and allows the emulsion containing the detackified and dispersed paint solids to remain generally within a fluid state until isolated and separated from the water and oil phases.

As in the past, these spent emulsions which can contain high loadings of oversprayed and detackified paint solids, are broken by adjusting pH to below 6.5, preferably below 4, and most preferably about 3 or below, and allowed to separate into its separate water, oil, and sludge phases.

Hence, the emulsion that detackifies the paint solid is broken into its separate phases by the addition of acid. The phases are allowed to separate and Patzelt teaches:

> "The oversprayed paint solids should be detackified to the point where they can be readily separated from the emulsion being employed. This separation step may be done by filtration, flotation, coagulation, or the like."

In another location in his patent Patzelt teaches: "Detackified paint particles can be removed from the oil-in-water emulsion by flotation, skimming, or the like. If the detackified paint overspray sludge floats on the surface of the emulsion, removal may be readily accomplished by skimming using known means. Saturation is, of course, also allowable and may be employed. The method of separation employed is not critical to this invention and other means known to those skilled in the art may be employed. In some instances it may be preferable to break the emulsion prior to removing the sludge. When the process of this invention is employed on enamel and/or base coat-clear coat materials, oily sludges may be produced which may tend to sink to the bottom of the sludge removal system, and then means for removing sludge from the bottom of the sludge removal system should be provided."

However, there is no place in Patzelt's teachings where he specifies exactly the preferred technique for removing paint solids, particularly those that ". . . tend to sink to the bottom of the sludge removal system, . . . ."

It is an object of this invention to present an optimized system for removing paint solids collected in a paint spray booth operated with a circulating oil-in-water emulsion and forming the so-called "water curtain", and permitting collection of oversprayed paint, the detackification of the paint, and the accumulation of the detackified paint particles within the so-called spent oil-in-water emulsion.

THE INVENTION

We have discovered that we can recover a high solids, high BTU paint sludge from an oil-in-water emulsion circulating within a paint spray booth and collecting oversprayed paint, thereby detackifying said oversprayed paint and dispersing said oversprayed paint solids within the recirculating emulsion. Therefore, in a process for removal of detackified oversprayed paint particles from paint spray booths of the type comprising a chamber, means for passing a wash stream capturing oversprayed paint particles across a liquid curtain and through said chamber, a sump located at the bottom of that chamber and containing a circulating oil-in-water emulsion receiving said oversprayed paint particles from said wash stream, said oil-in-water emulsion comprised of:

(a) 1.50 weight percent of an organic liquid having a boiling point of at least 150° C.,
(b) 0.1-30 weight percent based on the organic liquid of an oil-in-water emulsifier,
(c) the balance, water; and said emulsion having a pH ranging between about 7.5-12.0, and wherein the emulsion is circulated through the paint spray booth until the oil-in-water emulsion collects, detackifies and suspends at least 5 parts by weight of said oversprayed paint solids for every 100 parts by weight of said organic liquid, thereby forming a spent emulsion, the improvement comprising:

(a) removing the spent emulsion, or a portion thereof, from the paint spray booth;
(b) adjusting the pH of that portion of the spent emulsion removed in (a) to below about 6.5, thereby breaking the spent emulsion into a first aqueous phase, an oil phase, and spent sludge phase;
(c) allowing phase separation for a sufficient period of time to isolate and then remove at least a portion of the first aqueous phase from the oil phase and the paint sludge phase, thereby forming a oil-continuous low water spent emulsion; then
(d) feeding the low water spent emulsion into a three-phase centrifugal separator operating so that said low-water spent emulsion is treated at a machine gravity of at least 200 Gs, and
(e) separating from said centrifugal separator an oil phase, a second water phase, and a concentrated paint solids phase which concentrated paint solids contain from about
   10-25 weight percent oil,
   10-20 weight percent water, and at least about
   60-75 weight percent paint solids,
   which concentrated paint solids has a BTU value of at least 10,000 BTU/lb.

In practicing our invention, normally the first aqueous phase and the second aqueous phase collected from the above processes are combined and discarded or alternatively, both may be treated to remove contaminants and recycled to reformulate the oil-in-water emulsion. The oil phase which is recovered from the three-phase centrifugal separator may also contain some residue suspended paint solids. These paint solids may be removed using filtration, or may also be removed using additional centrifugation, which can be accomplished by using either the three-phase centrifugal separator, such as the one described above and below, or may be accomplished by simply using a two-phase centrifugal separator or a normal centrifuge.

The oil phases recovered are preferably recycled to reform at least a portion of fresh oil-in-water emulsion to be recharged to the paint spray booth system. The oil phase may contain some small residue of solids in the reformulation of the oil-in-water emulsion or may be treated to remove whatever portion of paint solids might still be contained within the oil phase prior to reformulation of the oil-in-water emulsion for reuse in the paint spray booth.

The concentrated paint solids recoverable from the three-phase centrifugal separator normally contain between 10-25 weight percent oil, preferably between 10-15 weight percent oil, and contains from 10-20 weight percent water, preferably between 10-15 weight percent water, and contains from 60-75 weight percent paint solids, preferably between 65-75 weight percent paint solids. These concentratd paint solids may then be used as auxiliary fuels since the concentrated paint solids normally has a concentrated BTU value of at least 10,000 BTU's/lb. Most concentrated paint sludges are recovered with a BTU value of at least 12,500 BTU's/lb, particularly if they are admixed with other waste oils which can be used to fuel a burner, for example to generate steam or to operate, for example, a cement kiln. Generally speaking, the normal solvents used herein would have a BTU value of between about 17-18,000, if used alone and absent paint solids.

Preferably, the concentrated paint solids are shipped to an environmental treating agency or company where they can be combined with spent solvents or waste oils, preferably using high shear mixing equipment, and then this preferably liquid admixture of the spent/waste solvents or oils with the concentrated paint solids may be used as an auxiliary fuel to fire the various burners to provide heat which can be used to generate steam energy, operate a cement kiln, and the like.

With the recovery of the water phase and the recovery of the oil phase, the recycle of the oil phase back to reform fresh oil-in-water emulsion to be recharged to the paint spray booth and the use of the spent solvents, waste oils, and concentrated paint solids as auxiliary fuels, we have accomplishesd the goal of complete recycle of all of the materials used in the original oil-in-water paint spray booth as well as the paint solids and detackified paint solids accumulated in and dispersed within the oil-in-water emulsion circulating within the paint spray booth system.

In operating the three-phase centrifugal separator, it is preferred that this three-phase centrifugal separator be a decanter centrifuge operating so that the machine G-force is between about 10 to 5000 Gs or above. By the term "Gs" we mean to indicate one force of gravity. Five hundred Gs therefore is 500 times one force of gravity. Preferably, the machine G-force for the three-phase decanter centrifuge operates at at least 1000 Gs and most preferably at at least 2000 Gs and above. Preferred results have been obtained experimentally when the three-phase decanter centrifuge is operating at a G-force equal to at least 3500-4000 Gs. However, it has been determined that above 500 Gs, the G-force used in the centrifuge does not affect the ability to separate oil-in-water phases, but simply affects the time in which the separation can occur. For an effective time period it has been found with pilot plant equipment treating from between 5-10 gpm (gallons per minute) of the combined low water spent emulsion that the G-forces are effective when operating above 2000 Gs and that the machine G-forces are preferably in the range of about 3500-4000 Gs.

Most of the test work being done with these three-phase centrifugal separators also indicated that a disc or a disc-nozzle centrifuge could be effectively used to separate the phases in a manner described above. However, when using the disc centrifuge, more suspended solids were found in both the residual water phase and the residual oil phase remaining after exposure to the centrifuge. Therefore, under these test conditions, it is preferred that the three-phase centrifugal separator be chosen from the group consisting of a three-phase decanter centrifuge and a three-phase disc centrifuge or a three-phase disc-nozzle centrifuge. It is most preferred that the three-phase centrifugal separator is a three-phase decanter centrifuge.

The difficulty was encountered with the low water spent emulsion feed into the three phase centrifugal separators when the temperatures of the low water spent emulsion were below about 30° F. The viscosities encountered at these low temperatures made the job of separating paint solids from oil and water phases difficult and also exaggerated the difficulty of establishing a water/oil interface. However, if temperatures can be maintained within the range of about 3° C. to about 90°–97° C., and preferably between about 10°–85° C., and the machine gravity force is at least about 1000–2000 Gs, the operation of the three phase centrifuge separating water, oil and paint solids as described above can be easily accomplished. Preferably, the temperature of the low water emulsion being fed into the three phase centrifugal separator ranges between about 10° C. to about 85° C. and most preferably, the temperatures range between about 15° C. and about 60° C. When the temperatures are in the upper ranges, e.g. in the preferred ranges mentioned above, the viscosities of this low water spent emulsion which contains paint solids are such that they are easily fed to the three phase centrifugal separator and the separation of each of the phases is easily accomplished.

Operating in this fashion, such as described above, allows us to obtain the following results:

1. Paint sludge solids were obtained from the three-phase centrifugal separator being fed low water spent emulsion and contained from 10–25 weight percent oil, from 10–20 percent water, and from 60–75 percent paint solids. This is compared to a paint sludge obtained by gravity which has the following characteristics: 60 percent water, 10 percent solids, and the remainder oil. This gravity isolated paint sludge has an extremely low heating value ranging between about 5000–6000 BTU's/lb. The heating value of our concentrated paint solid is at least 10,000 BTU's/lb., preferably at least 20,000 BTU's/lb. and can be much higher depending upon the solids being collected and the types of paints being originally used, as well as other factors, including oil content and the like.

2. The centrifuge processing of spent emulsion having low water content reduces the oil lost by gravity separation by a factor of 25–30 times. Oil lost from gravity separation of oil-in-water emulsion used in the past accounted for about 25–35 percent of the total oil used in the oil-in-water emulsion to detackify, suspend, and collect oversprayed paint solids. Centrifugation of the sludges obtained in the above process reduced this oil loss to between 1–5 percent of the total and preferably allowed as little as from 1–2.5 percent loss of the total original oil. This accounts for at least a 90 percent increase in the ability to recycle and reuse oil in the original oil-in-water emulsions.

3. Clarity of the oil-in-water phases obtained from the three-phase decanter centrifuge was primarily dependent upon the feed flowrate that were set to feed the centrifuge equipment. The oil-to-solids ratio in the oil phase collected from the centrifuge ranged from about 50–55:1 to about 5:1 as the feed flowrate to the centrifuge went from about 0.4–0.6 to about 8.5 gpm The water to solids ratio in the water phase ranged from about 195–200:1 to about 5–6:1 over the same range of feed flowrates.

To better understand our invention and demonstrate its use the following examples are presented:

EXAMPLES

Example 1

A spent emulsion was collected from a pilot scale facility being used to process spent emulsion from a plant being tested in a Midwest spray painting plant using paint spray booths operated with recirculating oil-in-water emulsion. The spent emulsion from the sumps of the oil-in-water emulsion paint spray booth was collected and stored in a facility containing three 12,000 gal. insulated tanks, two 17,000 gal. steel tanks, and a three-phase decanter centrifuge. In addition, two 30,000 gal. storage tanks were used to contain inbound spent emulsion from the sump of the operating paint spray booths. The spent emulsion was off-loaded from tankers used to collect this spent emulsion from the paint spray booth sumps into storage tanks of up to 30,000 gal. capacity. To this emulsion acid was added, which acid can be any inorganic acid, such as hydrochloric acid, sulfuric acid, and the like, but preferably is sulfuric acid, and the acidified spent emulsion is mixed. The pH of the water phase of this acidified emulsion is measured and adjusted in such a way so that the pH is below 6.5 and preferably below about 4, and most preferably to a pH of 3 or less. Additional mixing occurs to stabilize the pH in the emulsion and a broken emulsion is resolved into its phases over a period of time ranging between about 6 hrs. to about 40 hrs., preferably between about 15–25 hrs. After resolution of the broken emulsion phases occurs, a sludge layer which contains primarily both the oil phase and the paints solids phase is pumped to a storage tank and from there pumped to the centrifuge for additional processing. The first water phase is collected in such a way that it is not added to the centrifuge, but is either treated for disposal or recycle.

The three-phase decanter centrifuge used was a Bird Model 1350 having bowl dimensions of 12.5" in diameter and 38" in length. This unit was typically operated to produce forces on the combined oil and paint solid feed of (low water spent emulsion) from at least 500 times the force of gravity (500 Gs), but preferably was typically operated to produce G-forces on the sludge between about 1000 to about 5000 times the force of gravity; most preferably between about 3500–4000 Gs. Experiments were also conducted at lower G-forces so that the simulation could be used to equate to other centrifugal separating devices such as disc centrifuges and disc/nozzle centrifuges. Typically, these centrifuges operate with a G-force ranging between about 2000 and about 3000 Gs.

The oil sludge, which combines the low water spent emulsion or the oil phase and paint solids phase from the resolved broken emulsion was then fed to the Bird Model 1350 decanter centrifuge at a rate ranging between about 5–6 gpm using a Moyno progressing cavity pump. This pump is obtained from Robbins & Meyers, Inc., 1895 West Jefferson St., Springfield, Ohio 45501. This type of pump controls the feedrate to the decanter centrifuge at a reasonably constant rate which was found to be important in being able to control the operation and output of the centrifuge. When the feedrate to the centrifuge is erratic, the results from the centrifuge are also erratic. It is therefore important at least at the pilot scale level to control the feedrate of the oil/paint solids sludge at a relatively constant rate to control and achieve optimum operation of the decanter centrifuge.

The oil phase from the decanter centrifuge is pumped to a storage tank where further separation of residuals solids can occur by gravity, by filtration or by additional centrifugation. The surfactant content of the oil can then be tested and readjusted, if needed, and after this is accomplished, the oil can be used directly to prepare fresh oil-in-water emulsion. In our instant example, we tested for the oleic acid content of the oil which was adjusted, if necessary, to a concentration ranging preferably between 5–7 weight percent, based on total oil in the emulsion, and the oil oleic acid mixture was sent back to the spray-painting plant to remake fresh emulsion to be used in the paint spray booth system.

The water from the decanter is admixed with the break water obtained from the original broken emulsion and then treated and disposed, or it, too, may be recycled, if economical to do so, to form fresh emulsion for use in the paint spray booth.

The paint solids cake from the centrifuge was drummed and shipped to a third party which mixed the semi-solid, gum-like cake with other waste solids or waste solvents obtained from separate treating operations, which mixing required high shear mixing, to form a liquid, pumpable waste fuel admixture. Then this third party used the combination of this admixed cake and waste solvent in an auxiliary fuels program, which program supplies heat energy which operated cement kilns.

The testing of this concept originally began using a centrifugal pump and gate valves to control flow of the oil sludge to the centrifuge. The viscosity of the sludge, the sludge flowrate and centrifuge performance were very erratic, since the feedrate varied between about 7–15 gpm with no reliable ability to adjust this feedrate using the centrifugal pump. The solids in the recovered oil phase using such a system ranged between about 12–15 percent, which is considerably higher than those achieved in later tests using the control feedrate mentioned above. The centrifugal pump was replaced with a variable speed Moyno progressing cavity pump, and centrifuge performance showed an automatic improvement.

Comparison of centrifuge performance occurs in Tables 1, Tables 2, and Tables 3 below.

TABLE 1

CENTRIFUGE RESULTS
PAINT SLUDGE AFTER pH ADJUSTMENT AND EMULSION RESOLUTION
(CENTRIFUGAL PUMP)
(from 7–15 gpm)
erratic

| RUN NO. | SAMPLE | FLOW (gpm) | OIL (%) | WATER (%) | SOLIDS (%) |
|---|---|---|---|---|---|
| 1 | Feed | 9.15 | 43.7 | 38.1 | 18.2 |
| | Oil | | 56.6 | 31.3 | 12.1 |
| | Water | | 0.0 | 97.6 | 2.4 |
| | Cake | | | 15.8 | |
| 2 | Feed | 7.60 | 44.9 | 37.2 | 17.9 |
| | Oil | | 48.9 | 38.4 | 12.7 |
| | Water | | 0.0 | 98.9 | 1.1 |
| | Cake | | | 13.2 | |
| 3 | Feed | | 42.4 | 31.5 | 26.0 |
| | Oil | | 62.8 | 18.9 | 18.3 |
| | Water | | 0.0 | 98.4 | 1.6 |
| | Cake | | | 13.0 | |

TABLE II

CENTRIFUGE RESULTS
PAINT SLUDGE
MOYNO PUMP
(controlled rate)

| RUN NO. | SAMPLE | FLOW (gpm) | OIL (%) | WATER (%) | SOLIDS (%) |
|---|---|---|---|---|---|
| 1 | Feed | 2.67 | 36.9 | 26.5 | 36.6 |
| | Oil | 0.90 | 83.0 | 15.0 | 2.0 |
| | Water | 0.70 | 0.0 | 99.4 | 0.6 |
| | Cake | | | 21.5 | |
| 2 | Feed | 4.44 | 34.9 | 27.1 | 38.0 |
| | Oil | 1.23 | 95.8 | 0.0 | 4.2 |
| | Water | 1.16 | 0.0 | 98.2 | 1.8 |
| | Cake | | | 23.6 | |
| 3 | Feed | 5.81 | 40.2 | 23.7 | 36.1 |
| | Oil | 3.50 | 63.1 | 28.9 | 8.0 |
| | Water | 2.45 | 0.0 | 93.2 | 6.8 |
| | Cake | | | 21.8 | |
| 4 | Feed | 8.50 | 58.4 | 18.0 | 23.6 |
| | Oil | 4.55 | 51.2 | 38.3 | 10.5 |
| | Water | 2.31 | 0.0 | 86.7 | 13.3 |
| | Cake | | | 22.6 | |

TABLE III

CENTRIFUGE RESULTS
PAINT SLUDGE AFTER EMULSION BREAKING
MOYNO PUMP

| RUN NO. | SAMPLE | FLOW (gpm) | OIL (%) | WATER (%) | SOLIDS (%) |
|---|---|---|---|---|---|
| 1 | Feed | | 40.5 | 41.2 | 18.3 |
| | Oil | 0.27 | 98.1 | 0.0 | 1.9 |
| | Water | 0.20 | 0.0 | 99.1 | 0.9 |
| | Solids | | | 18.7 | |
| 2 | Feed | | 37.1 | 42.7 | 20.2 |
| | Oil | 2.30 | 87.9 | 3.3 | 8.8 |
| | Water | 1.61 | 0.0 | 98.5 | 1.5 |
| | Solids | | | 21.0 | |
| 3 | Feed | | 36.9 | 43.1 | 20.0 |
| | Oil | 2.80 | 81.5 | 4.6 | 13.9 |
| | Water | 2.47 | 0.0 | 97.7 | 2.3 |
| | Solids | | | 19.8 | |
| 4 | Feed | | 38.0 | 43.0 | 19.0 |
| | Oil | 4.23 | 85.2 | 0.0 | 14.8 |
| | Water | 3.55 | 0.0 | 98.3 | 1.7 |
| | Solids | | | 19.6 | |

Using controlled feedrates, solids in the oil phase dropped as low as 2 percent when low feedrates were used. Paint solids cake generation increased 50 percent to obtain from 6–7 drums of paint solids per day. The flowrate into the pilot system ranging between 5–6 gpm was selected for optimum daily operation.

EXAMPLE 2

Spent emulsion was also evaluated in terms of its feed to the centrifuge. The oil-in-water spent emulsion obtained from the sumps of the paint spray booth system was acidified in line with sulfuric acid, adjusted to a pH below about 6.5, preferably about 3–4.0 and pumped directly to the three-phase decanter centrifuge for processing. The results are given in Table IV.

TABLE IV

CENTRIFUGE RESULTS
ACIDIFIED SPENT EMULSION BEFORE
EMULSION BREAKING MOYNO PUMP

| RUN NO. | SAMPLE | FLOW (gpm) | OIL (%) | WATER (%) | SOLIDS (%) |
|---|---|---|---|---|---|
| 1 | Feed | | 29.8 | 62.7 | 7.5 |
| | Oil | 2.28 | 29.0 | 64.2 | 6.8 |
| | Water | 2.42 | 0.0 | 94.7 | 5.3 |
| | Solids | | | | |
| 2 | Feed | | 28.0 | 65.5 | 6.5 |

TABLE IV-continued

| CENTRIFUGE RESULTS ACIDIFIED SPENT EMULSION BEFORE EMULSION BREAKING MOYNO PUMP | | | | | |
|---|---|---|---|---|---|
| RUN NO. | SAMPLE | FLOW (gpm) | OIL (%) | WATER (%) | SOLIDS (%) |
| | Oil | 1.62 | 73.4 | 18.8 | 7.8 |
| | Water | 4.78 | 7.4 | 84.7 | 7.9 |
| | Solids | | | | |
| 3 | Feed | | 27.5 | 66.2 | 6.3 |
| | Oil | 0.75 | 64.9 | 24.8 | 10.3 |
| | Water | 5.64 | 2.8 | 90.9 | 6.3 |
| | Solids | | | | |

As can be seen the separation is extremely poor. As a result it would appear necessary to break the emulsion by pH adjustment, and then allow for the phase separation and removal of some portion, preferably a major portion (more than 50%) of the aqueous phase obtained by breaking the emulsion, and then feeding at controlled flowrate the paint sludge consisting of both paint oil phase and paint solid phase to the three-phase decanter centrifuge.

Example 3

Tables V and VI below describe the results of scale-up testing for various types of three-phase decanter centrifuges, such as Bird Models 2550, and Bird Models 2650. These two models are capable of achieving and were tested at machine G-forces of 3700 Gs and 2800 Gs respectively.

TABLE V

| CENTRIFUGE RESULTS PAINT SLUDGE (LOW WATER SPENT EMULSION) MOYNO PUMP BIRD MODEL 2550 SIMULATION | | | | | |
|---|---|---|---|---|---|
| RUN NO. | SAMPLE | FLOW (gpm) | OIL (%) | WATER (%) | SOLIDS (%) |
| 1 | Feed | 0.6 | 29.7 | 59.2 | 11.2 |
| | Oil | 0.2 | 98.2 | 0.0 | 1.8 |
| | Water | 0.3 | 0.0 | 99.3 | 0.7 |
| | Cake | | | 15.0 | |
| 2 | Feed | 4.0 | 29.8 | 61.2 | 9.0 |
| | Oil | 1.7 | 77.7 | 12.8 | 9.5 |
| | Water | 2.2 | 3.2 | 86.6 | 10.2 |
| | Cake | 2.4 | | 17.4 | |
| | | (lb./min.) | | | |
| 3 | Feed | 5.4 | 33.2 | 56.9 | 9.9 |
| | Oil | 3.7 | 56.9 | 35.0 | 8.1 |
| | Water | 3.7 | 18.1 | 73.3 | 8.6 |
| | Cake | 2.4 | | 14.3 | |
| | | (lbs./min.) | | | |
| 4 | Feed | 6.2 | 34.1 | 56.2 | 9.7 |
| | Oil | 4.9 | 49.1 | 43.6 | 7.3 |
| | Water | 5.9 | 5.5 | 79.3 | 15.2 |
| | Cake | 3.1 | | | |
| | | (lbs./min.) | | | |

TABLE VI

| CENTRIFUGE RESULTS PAINT SLUDGE (LOW WATER SPENT EMULSION) MOYNO PUMP BIRD MODEL 2650 SIMULATION | | | | | |
|---|---|---|---|---|---|
| RUN NO. | SAMPLE | FLOW (gpm) | OIL (%) | WATER (%) | SOLIDS (%) |
| 1 | Feed | 0.6 | 32.4 | 58.9 | 8.7 |
| | Oil | 0.2 | 97.2 | 0.0 | 2.8 |
| | Water | 0.3 | 0.0 | 99.5 | 0.5 |
| | Cake | | | 13.4 | |
| 2 | Feed | 3.3 | 32.1 | 58.8 | 9.1 |
| | Oil | 1.3 | 74.6 | 19.1 | 6.3 |
| | Water | 2.5 | 5.6 | 83.3 | 11.1 |
| | Cake | 1.5 | | 11.0 | |

TABLE VI-continued

| CENTRIFUGE RESULTS PAINT SLUDGE (LOW WATER SPENT EMULSION) MOYNO PUMP BIRD MODEL 2650 SIMULATION | | | | | |
|---|---|---|---|---|---|
| RUN NO. | SAMPLE | FLOW (gpm) | OIL (%) | WATER (%) | SOLIDS (%) |
| | | (lb./min.) | | | |
| 3 | Feed | 4.7 | 31.6 | 58.8 | 9.6 |
| | Oil | 2.0 | 63.0 | 30.8 | 6.2 |
| | Water | 2.7 | 6.0 | 82.0 | 12.0 |
| | Cake | 1.9 | | | |
| | | (lbs./min.) | | | |
| 4 | Feed | 5.7 | 32.0 | 59.1 | 8.9 |
| | Oil | 2.9 | 58.9 | 34.2 | 6.9 |
| | Water | 3.4 | 13.6 | 77.5 | 8.9 |
| | Cake | 2.3 | | | |
| | | (lbs./min.) | | | |

Tables V and VI lead to the conclusion that phase separation within this range of G-force is not dependent on the G-forces to which the paint sludges are exposed, and that only the time needed to achieve the preferred separation is effected by variation of the G-forces above about 500 G's.

Similarly, Tables VII and VIII below show results obtained from paint sludges recovered from a base coat/clear coat paint spray booth and a second paint spray booth operating with a high solids enamel/prime paint spray booth. The results appear to be similar irrespective of the different kinds of paint and paint oversprays being collected in the paint spray booth operating on the oil-in-water emulsion.

TABLE VII

| CENTRIFUGE TEST PAINT SLUDGE FROM BASE COAT/CLEAR COAT BOOTH MOYNO PUMP | | | | | |
|---|---|---|---|---|---|
| RUN NO. | SAMPLE | FLOW (gpm) | OIL (%) | WATER (%) | SOLIDS (%) |
| 1 | Feed | 3.79 | 55.0 | 37.7 | 7.3 |
| | Oil | 2.39 | 79.3 | 15.4 | 5.3 |
| | Water | 1.28 | 0.0 | 99.2 | 0.8 |
| | Cake | | 23.0 | 3.0 | 74.0 |
| 2 | Feed | 5.71 | 55.2 | 37.5 | 7.2 |
| | Oil | 3.43 | 74.8 | 19.4 | 5.8 |
| | Water | 2.29 | 0.0 | 99.0 | 1.0 |
| | Cake | | 26.5 | 2.5 | 71.0 |
| 3 | Feed | 7.72 | 59.6 | 33.1 | 7.3 |
| | Oil | 4.23 | 67.7 | 26.3 | 6.0 |
| | Water | 7.62 | 13.0 | 84.3 | 2.7 |
| | Cake | | 27.0 | | |
| 4 | Feed | 3.49 | 97.2 | 0.0 | 2.8 |
| | Oil | 3.62 | 96.1 | 0.0 | 3.9 |
| 5 | Feed | 5.29 | 96.3 | 0.0 | 3.7 |
| | Oil | 8.48 | 96.5 | 0.0 | 3.5 |
| 6 | Feed | 6.93 | 96.3 | 0.0 | 3.7 |
| | Oil | 9.48 | 97.1 | 0.0 | 2.9 |

TABLE VIII

| CENTRIFUGE RESULTS PAINT SLUDGE FROM HIGH SOLIDS ENAMEL/PRIME BOOTH MOYNO PUMP | | | |
|---|---|---|---|
| SAMPLE | OIL (%) | WATER (%) | SOLIDS (%) |
| Feed (@ Start) | 38.0 | 38.6 | 23.4 |
| Oil | 96.6 | 0.0 | 3.4 |
| Water | 12.3 | 86.1 | 1.6 |
| Cake | 11.9 | 10.3 | 78.8 |
| Feed (@ End) | 52.0 | 30.3 | 17.7 |

Table IX summarizes other centrifuge performance data. As can be seen, oil clarity is related to the sludge flowrate, water clarity is related to the sludge flowrate (to a lesser degree), but this can be easily explained by the fact that the weirs on the centrifuge were set to maximize the oil/water separation resulting in carry-over of solids into the water phase. Persons familiar with the art could easily modify the setting of the weirs on the centrifuge to control separation and clarity of either oil phase or water phase.

The weirs are a set of plates that together form a regulating ring. This ring is adjustable and is used to control the rate at which the oil and water phases are discharged.

TABLE IX

SUMMARY OF CENTRIFUGE PERFORMANCE

| FEED FLOW | OIL FLOW | WATER FLOW | SOLIDS RATIO IN OIL | WATER TO SOLIDS RATIO IN WATER |
|---|---|---|---|---|
| 9.15 | | | 4.68 | 40.67 |
| 7.60 | | | 3.85 | 89.91 |
| 2.67 | 0.90 | 0.70 | 41.50 | 165.67 |
| 4.44 | 1.23 | 1.16 | 22.81 | 54.56 |
| 5.81 | 3.50 | 2.45 | 7.89 | 13.71 |
| 8.50 | 4.55 | 2.31 | 4.88 | 6.52 |
| | 0.27 | 0.20 | 51.63 | 110.11 |
| | 2.30 | 1.61 | 9.99 | 65.67 |
| | 2.80 | 2.47 | 5.86 | 42.48 |
| | 4.23 | 3.55 | 5.76 | 57.82 |
| 0.60 | 0.20 | 0.30 | 54.56 | 141.86 |
| 4.00 | 1.70 | 2.20 | 8.18 | 8.49 |
| 5.40 | 3.70 | 3.70 | 7.02 | 8.52 |
| 6.20 | 4.90 | 5.90 | 6.73 | 5.22 |
| 0.60 | 0.20 | 0.30 | 34.71 | 199.00 |
| 3.30 | 1.30 | 2.50 | 11.84 | 7.50 |
| 4.70 | 2.00 | 2.70 | 10.16 | 6.83 |
| 5.70 | 2.90 | 3.40 | 8.54 | 8.71 |
| 3.79 | 2.39 | 1.28 | 14.96 | 124.00 |
| 5.71 | 3.43 | 2.29 | 12.90 | 99.00 |
| 7.72 | 4.23 | 7.62 | 11.28 | 31.22 |

Example V

A three-phase disc centrifuge machine was also tested. The feed for this machine was the oil phase from the decanter separating centrifuge. Initial test occurred at ambient conditions of about 50° F. and with a non-controlled feedrate, were unsuccessful in that the oil phase obtained from the disc was dirty and no solids were removed from the machine whatsoever.

Further work with this disc machine using a cleaner feed heated to 125° F. and using controlled feed rates achievable by the Moyno pump mentioned above, which feed rate ranges between 0.5 to about 1.0 gpm produced a clean oil phase, but again no solids were removed from the machine.

The centrifuge was dismantled and inspected and found to indeed have worked since the centrifuge was packed with solids of a very spongy consistency which appeared to be solids which had dewatered so quickly in the disc centrifuge as to become immobile and therefore unable to be transported to the discharge portions and lines of the three-phase disc machine. Therefore, although our tests appear to be faulty, it is anticipated that use of these three-phase disc machines can be achieved with further work and it is a portion of this invention that such three-phase disc machines may be used in the above process.

In summary, results presented in the Tables above appear to show that the oil-in-water emulsion containing paint solids which spent emulsion is recoverable from a paint spray booth sump, in a spray booth operating with such an oil-in-water emulsion, may be treated in a way to collect and detackify and then remove paint solids dispersed therein by using the processes described above. The performance of the process seem to be dependent upon the controlled and relatively consistent feedflow rate of low water spent emulsion, and the ability to control this flowrate within a relatively narrow but constant range, and also, dependent upon the weir settings of a three-phase centrifuge, either of the three-phase disc centrifuge type or the three-phase decanter centrifuge type. The ability to separate paint sludges seems to be independent of sludge composition in terms of solids content or sludge type in terms of the amount or types of paint being collected in the paint spray booth. In other words, irrespective of the paint being used, or in fact independent of machine G-forces, at least above about 500–2000 Gs.

Having described my invention, I claim.

1. In a process for removal of detackified oversprayed paint particles from paint spray booths of the type comprising a chamber, means for passing a wash stream capturing oversprayed paint particles across a liquid curtain and down through said chamber, a sump located at the bottom of said chamber and containing a circulating oil-in-water emulsion receiving said oversprayed paint particles from said wash stream, said oil-in-water emulsion comprised of:

(a) 1–50 weight percent of an organic liquid having a boiling point of at least 150° C., (b) 0.1–30 weight percent, based on the organic liquid, of an oil-in-water emulsifier, (c) the balance, water, and said emulsion having a pH ranging between about 7.5-12.0, and wherein the emulsion is circulated through the paint spray booth until the oil-in-water emulsion collects, detackifies, and suspends at least 5 parts by weight of said oversprayed paint solids for every 100 parts by weight of said organic liquid, thereby forming spent emulsion, the improvement comprising:

(a) removing the spent emulsion, or a portion thereof, from the paint spray booth;

(b) adjusting the pH of the spent emulsion to below about 6.5, thereby braking the spent emulsion inot a first aqueous phase, an oil phase, and a paint sludge phase;

(c) allowing phase separation for sufficient time to isolate and remove at least a portion of the first aqueous phase from the oil phase and the paint sludge phase, thereby forming a low water spent emulsion, then (d) feeding the low water spent emulsion into a three-phase centrifugal separator operating so that said low water spent emulsion is treated at a machine gravity force range between about 10–5000 Gs, and (e) separating from said centrifugal separator an oil phase, a second water phase, and a concentrated paint solids phase containing from about
10–25 weight percent oil,
10–20 weight percent water,
60–75 weight percent paint solids.

2. The process of claim 1 wherein the first aqueous phase and the second aqueous phase are combined and discarded and the oil phase is recycled to reform at least a portion of fresh oil-in-water emulsion to be recharged to the paint spray booth.

3. The process of claim 1 wherein the concentrated paint solids are combined with spent/waste solids, solvents or oils obtained from treatment of various oily waste streams and used as an auxiliary fuel having a BTU value of at least 10,000 BTU's per pound auxiliary fuel.

4. The process of claim 1 wherein the three-phase centrifugal separator is a three-phase decanter centrifuge operating so that the machine G-force is at least 500 Gs.

5. The process of claim 4 wherein the machine G-force is at least 2000 Gs.

6. The process of claim 1 wherein the machine gravity force is at least 3000 Gs.

7. The process of claim 1 wherein the low water spent emulsion being fed to the three-phase centrifugal separator is maintained at an operating temperature ranging from about 3° C. to about 97° C. and the machine gravity force is at least about 2000 Gs.

8. The process of claim 7 wherein the three-phase centrifugal separator is chosen from the group consisting of three-phase disc centrifuges and three-phase decanter centrifuges, the operating temperature ranges between about 10°–85° C. and the machine gravity force is at least about 3000 G's.

* * * * *

UNITED STATES PATENT AND TRADEMARK OFFICE

CERTIFICATE OF CORRECTION

PATENT NO. : 4,814,092

DATED : March 21, 1989

INVENTOR(S) : Robert R. Patzelt

It is certified that error appears in the above-identified patent and that said Letters Patent is hereby corrected as shown below:

Column 12, Line 41
"about 6.5, thereby braking the spent emulsion inot"
should read
--about 6.5, thereby braking the spent emulsion into--.

Column 12, Line 52
"gravity force range between about 10-5000 Gs, and"
should read
--gravity force ranging between about 10-5000 Gs, and--.

Signed and Sealed this

Fourteenth Day of November, 1989

*Attest:*

JEFFREY M. SAMUELS

*Attesting Officer* *Acting Commissioner of Patents and Trademarks*